(12) United States Patent
Coulson

(10) Patent No.: US 9,624,903 B2
(45) Date of Patent: Apr. 18, 2017

(54) DRIVE APPARATUS FOR ELECTRICITY GENERATING APPARATUS

(75) Inventor: David Francis Coulson, Wooler (GB)

(73) Assignee: Innova Limited (GB)

( * ) Notice: Subject to any disclaimer, the term of this patent is extended or adjusted under 35 U.S.C. 154(b) by 532 days.

(21) Appl. No.: 13/823,430

(22) PCT Filed: Sep. 14, 2011

(86) PCT No.: PCT/GB2011/051720
§ 371 (c)(1),
(2), (4) Date: Mar. 14, 2013

(87) PCT Pub. No.: WO2012/035337
PCT Pub. Date: Mar. 22, 2012

(65) Prior Publication Data
US 2013/0189101 A1  Jul. 25, 2013

(30) Foreign Application Priority Data
Sep. 15, 2010 (GB) .................................. 1015354.2

(51) Int. Cl.
| | | |
|---|---|---|
| F03D 3/00 | (2006.01) | |
| F03D 7/06 | (2006.01) | |
| F03D 9/00 | (2016.01) | |
| F03D 3/06 | (2006.01) | |
| F03B 17/06 | (2006.01) | |

(52) U.S. Cl.
CPC .............. *F03D 3/00* (2013.01); *F03B 17/065* (2013.01); *F03D 3/005* (2013.01); *F03D 3/067* (2013.01); *F03D 3/068* (2013.01); *F03D 7/06* (2013.01); *F03D 9/002* (2013.01); *Y02E 10/28* (2013.01); *Y02E 10/74* (2013.01)

(58) Field of Classification Search
CPC . F03D 3/068; F03D 3/067; F03D 7/06; F03D 9/002; F05B 2240/214
USPC ... 416/17, 121, 122, 132 B, 117; 290/44, 55
See application file for complete search history.

(56) References Cited

U.S. PATENT DOCUMENTS 1,180,085 A * 4/1916 Stirtan ...................... F03D 3/00
 416/50
1,408,988 A * 3/1922 Chenoweth ............. F03D 3/068
 416/111

(Continued)

FOREIGN PATENT DOCUMENTS

AT 382687 * 12/1976 ............... F03D 3/00
AT 382687 B 3/1987

(Continued)

OTHER PUBLICATIONS

AT 382,687 Machine Translation.*

*Primary Examiner* — Alexander Comley
(74) *Attorney, Agent, or Firm* — Shaukat A. Karjeker; Carstens & Cahoon, LLP

(57) ABSTRACT

A drive apparatus for an electrical generator (2) is disclosed. The apparatus includes arms (6) adapted to support blades (14) in a flow of fluid. A central shaft (4) pivotably supports each of the arms about a respective horizontal axis such that flowing fluid engages the blades to cause rotation of the shaft about its longitudinal axis to actuate an electrical generator (28). A flap (16) adjusts orientation of the arms about the respective horizontal axes in dependence on direction of fluid flow.

12 Claims, 4 Drawing Sheets

(56) References Cited

U.S. PATENT DOCUMENTS

| | | | | |
|---|---|---|---|---|
| 1,443,912 A * | 1/1923 | Dominguez | ............ | F03D 3/065 |
| | | | | 416/118 |
| 1,741,248 A * | 12/1929 | Nitardy | ................... | F03D 3/068 |
| | | | | 416/17 |
| 2,006,024 A * | 6/1935 | Lockwood | .............. | F03D 3/067 |
| | | | | 416/110 |
| 3,942,026 A * | 3/1976 | Carter | ..................... | F03D 1/025 |
| | | | | 290/55 |
| 4,113,408 A * | 9/1978 | Wurtz | ..................... | F03D 3/068 |
| | | | | 416/117 |
| 4,161,370 A * | 7/1979 | Oppolzer | ................... | F03D 3/02 |
| | | | | 416/121 |
| 4,383,801 A * | 5/1983 | Pryor | ..................... | F03D 3/068 |
| | | | | 416/119 |
| 4,419,587 A * | 12/1983 | Benton | ................... | F03D 3/065 |
| | | | | 290/44 |
| 4,494,007 A * | 1/1985 | Gaston | ..................... | F03D 7/06 |
| | | | | 290/44 |
| 4,764,090 A * | 8/1988 | Danson | ................... | F03D 3/068 |
| | | | | 416/119 |
| 5,676,524 A * | 10/1997 | Lukas | ..................... | F03D 3/068 |
| | | | | 416/111 |
| 6,320,273 B1 * | 11/2001 | Nemec | ..................... | F03D 3/005 |
| | | | | 290/43 |
| 6,543,999 B1 * | 4/2003 | Polen | ..................... | F03D 3/067 |
| | | | | 416/116 |
| 7,766,602 B1 * | 8/2010 | Stroburg | ................ | F03D 3/068 |
| | | | | 415/4.2 |
| 2008/0213083 A1 * | 9/2008 | Unno | ..................... | F03D 3/067 |
| | | | | 415/4.2 |
| 2009/0035134 A1 * | 2/2009 | Kuo | ........................ | F03D 3/068 |
| | | | | 416/119 |

FOREIGN PATENT DOCUMENTS

| | | | | |
|---|---|---|---|---|
| DE | 42680 C | 3/1888 | | |
| DE | 2916988 A1 * | 11/1979 | ............... | F03D 3/02 |
| DE | EP 0095600 A1 * | 12/1983 | ............. | F03D 3/065 |
| GB | 2292191 A * | 2/1996 | ............. | F03D 3/06 |
| NL | 7903125 A | 10/1980 | | |
| WO | 2009107101 A2 | 9/2009 | | |

* cited by examiner

DRIVE APPARATUS FOR ELECTRICITY GENERATING APPARATUS

The present invention relates to a drive apparatus for an electricity generating apparatus, and to an electricity generating apparatus incorporating such drive apparatus.

Apparatus for conversion of kinetic energy of fluid flow into mechanical or electrical power exist in many forms, such as wind turbines or windmills in air, and flow turbines or tidal stream turbines in water. One category of such apparatus, known as "cross-flow turbines" consists of apparatus in which fluid flow passes through the apparatus transversely, or across the turbine blades. Examples of such apparatus are vertical axis wind turbines (VAWT) and vertical axis tidal turbines (VATT).

Known apparatus of this type suffers from the drawback that blades crossing the fluid flow on the upstream side of the turbine reduce and disturb the flow to blades passing further downstream. Typically in such turbines 2, 3 or 4 blades are attached to a central shaft in order to maintain balance and achieve more uniform torque. Since most torque is generated as a blade crosses the flow at right angles, when one blade is in a suitable position to contribute efficiently to total torque, other blades are either travelling more parallel to the fluid flow (generating high drag and less useful torque) or are in the "shadow" of the productive blade, which has extracted much of the stream energy, as a result of which they achieve high drag and much lower torque.

EP 0095600 discloses a turbine in which a rotor arm carrying rotor blades is mounted in an inclined manner to a rotation axis to minimise disturbance by one blade of fluid flow to the other blade. However, this arrangement suffers from the drawback that the efficiency of operation of the turbine is low because the axis of blade inclination is unrelated to fluid flow direction.

Preferred embodiments of the present invention seek to overcome one of more of the above disadvantages of the prior art.

According to an aspect of the present invention, there is provided a drive apparatus for an electrical generator, the apparatus comprising:
  at least one first support member adapted to support at least one respective blade in a flow of fluid;
  at least one second support member adapted to pivotably support at least one respective said first support member about a respective first axis such that flowing fluid engages at least one said blade to cause rotation of said second support member about a respective second axis to actuate an electrical generator; and
  first adjustment means for adjusting orientation of at least one said first support member about the respective said first axis relative to the corresponding said second support member in dependence on direction of fluid flow.

By providing first adjustment means for adjusting orientation of at least one first support member about the respective first axis relative to the corresponding second support member in dependence on the direction of fluid flow, this provides the advantage of enabling the efficiency of operation of the apparatus to be maximised, by enabling at least one upstream first support member to be oriented relative to the direction of fluid flow such that the extent to which downstream blades are in the shadow of upstream blades can be minimised.

Said first adjustment means may include at least one first alignment member adapted to be aligned along the direction of fluid flow and gear means adapted to adjust orientation of at least one said first support member about the corresponding said first axis.

The gear means may comprise a plurality of wheels mounted to one of said first alignment member and at least one said first support member and engaging a track mounted to the other of said first alignment member and at least one said first support member.

The apparatus may further comprise second adjustment means for adjusting orientation of at least one said blade relative to the corresponding said first support member in dependence on direction of fluid flow.

This provides the advantage of maximising the efficiency of the apparatus.

The second adjustment means may comprise at least one cam member mounted to one of (i) a said first support member and (ii) a said blade in use, and at least one cam follower mounted to the other of said first support member and said blade.

This provides the advantage of simplifying the construction of the apparatus, thereby reducing its cost; and such adjustment is achieved without the use of centrifugal forces created by weights attached to the blades, thus greatly reducing the system's inertia, and thereby improving efficiency.

The second adjustment means may comprise at least one second adjustment member adapted to connect at least one said blade with at least one said first alignment member.

At least one said first support member may include fluid engaging means for increasing the cross sectional area of engagement between said fluid and said first support member, in a direction transverse to the direction of relative motion of said fluid and said first support member, when said fluid engaging means is moving more slowly than said fluid.

This provides the advantage of assisting starting of the apparatus.

The fluid engaging means may comprise at least one fluid engaging member, having an elongate cross section in a direction transverse to a longitudinal axis of said first support member, and pivotably mounted to a body of said first support member.

At least one said first support member may be connected to the corresponding said second support member by means of at least one clutch.

This provides the advantage of enabling the transfer of torque from the blades to the second support member to be suitable controlled, for example to enable rotation of the second support member in one direction only.

The apparatus may further comprise a plurality of said first support members pivotable relative to each other and biasing means for angularly urging said first support members towards a rest position.

The apparatus may further comprise a plurality of said blades.

According to another aspect of the present invention, there is provided an electrical generator comprising a drive apparatus as defined above and an apparatus for generating electricity by means of actuation by said drive apparatus.

Preferred embodiments of the invention will now be described, by way of example only and not in any limitative sense, with reference to the accompanying drawings, in which.

Figure 1:
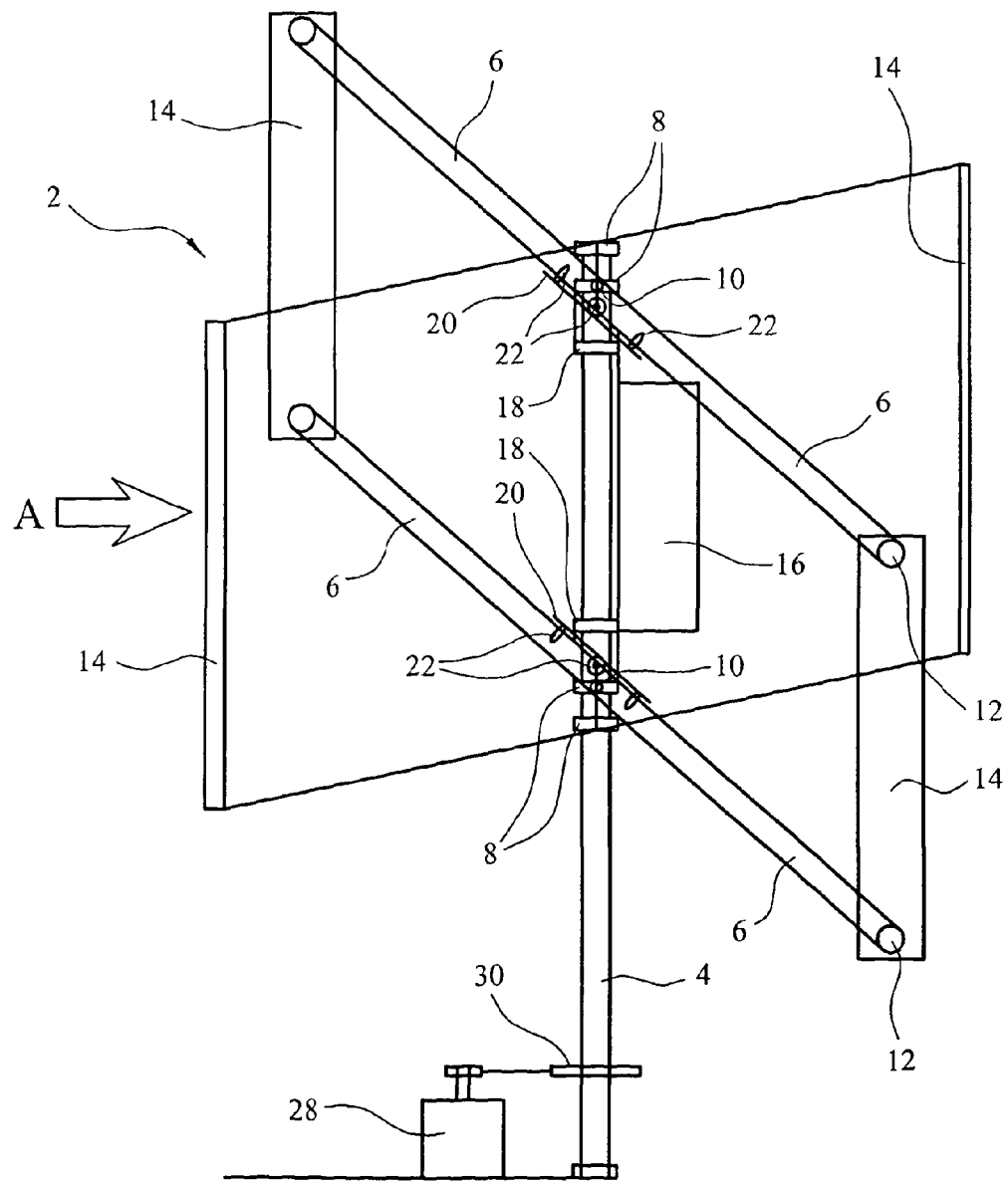
FIG. 1 is a schematic perspective view of an electricity generating apparatus of a first embodiment of the present invention.
Figure 3:
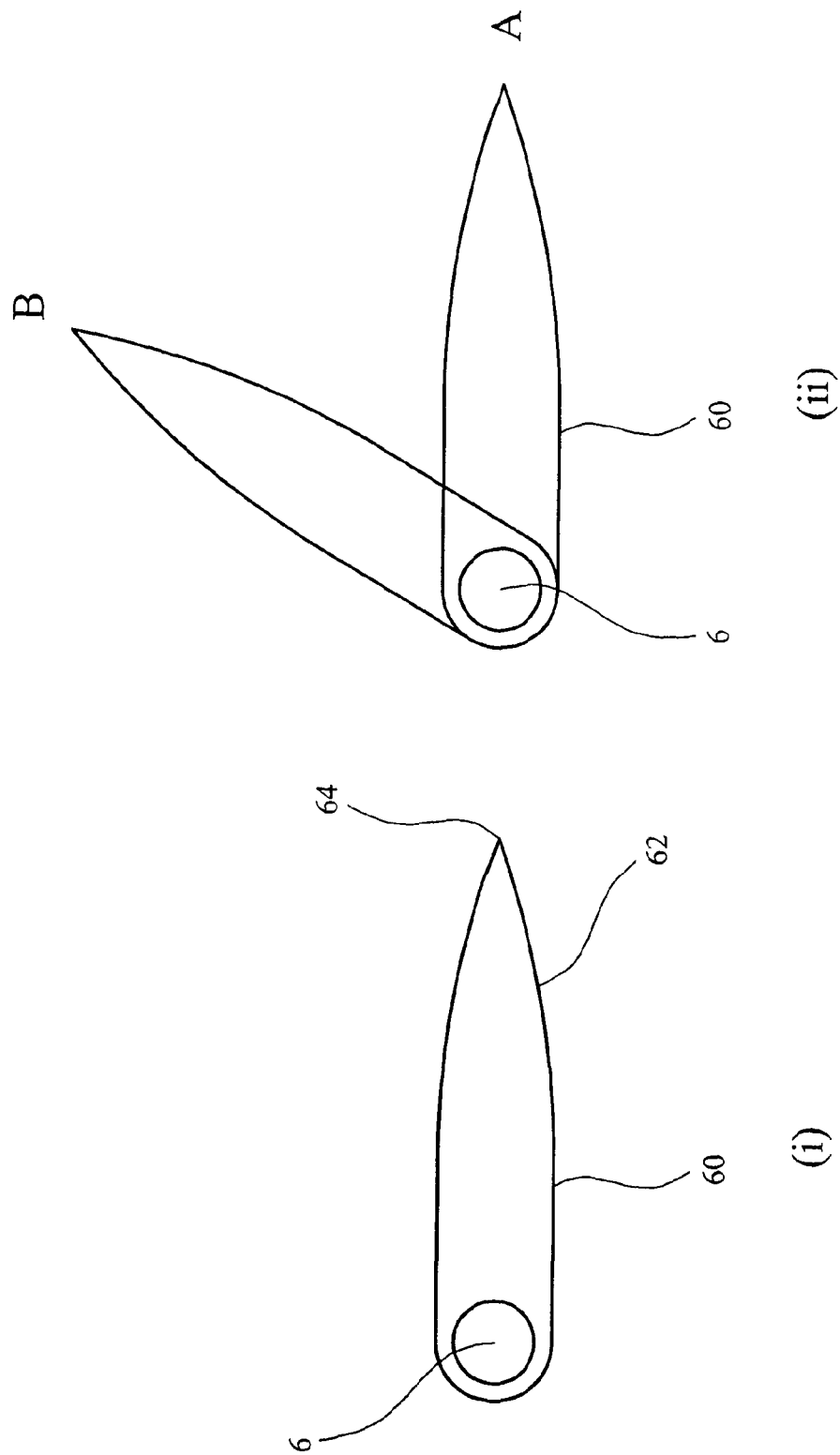
Figure 4:
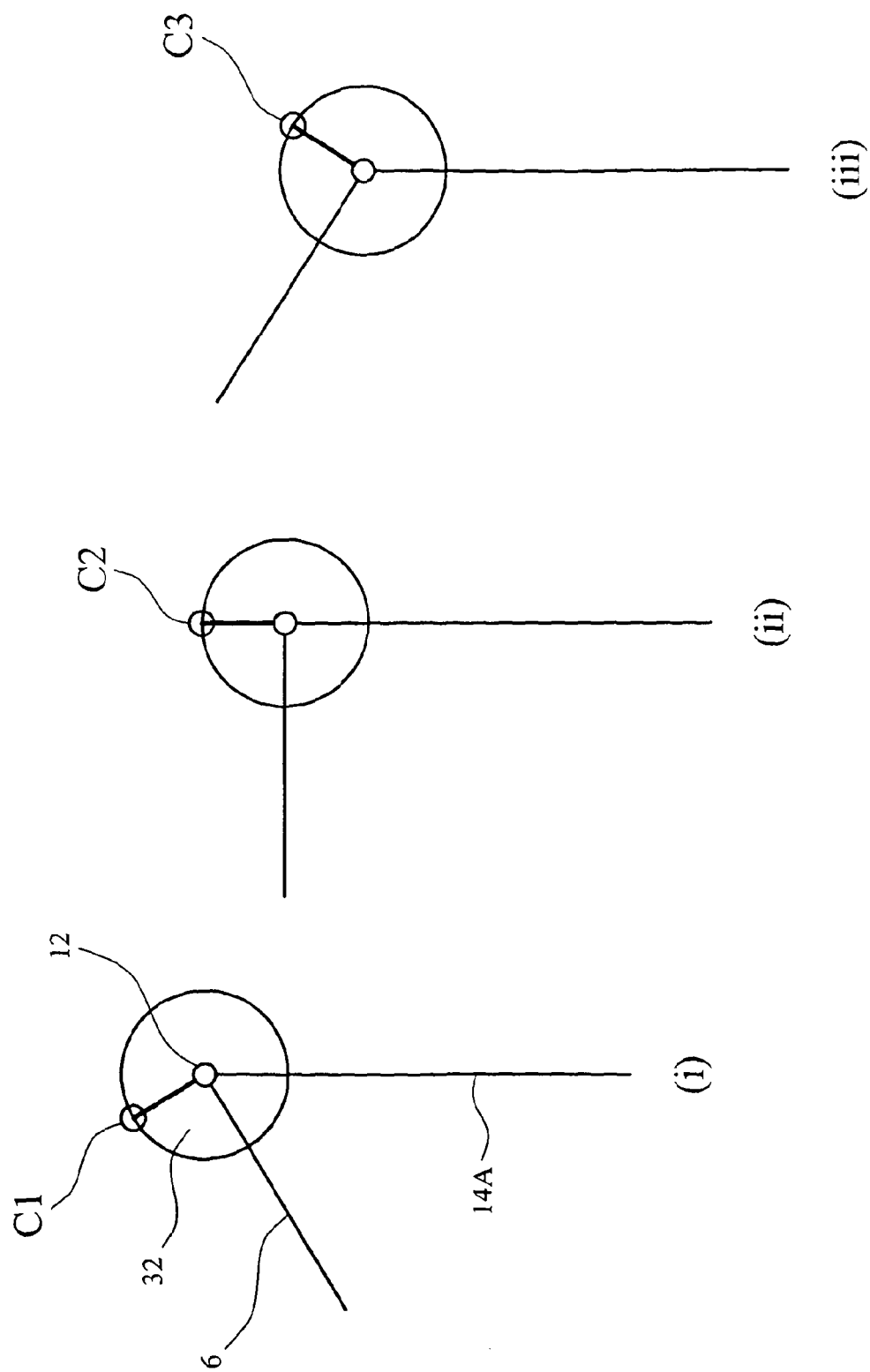

FIGS. 3(i) and 3(ii) are cross section views of a fluid engaging member for use with the apparatus of FIG. 1; and FIGS. 4(i) to 4(iii) show the operation of a blade pitch adjusting mechanism of a second embodiment of the present invention.

Figure 2:
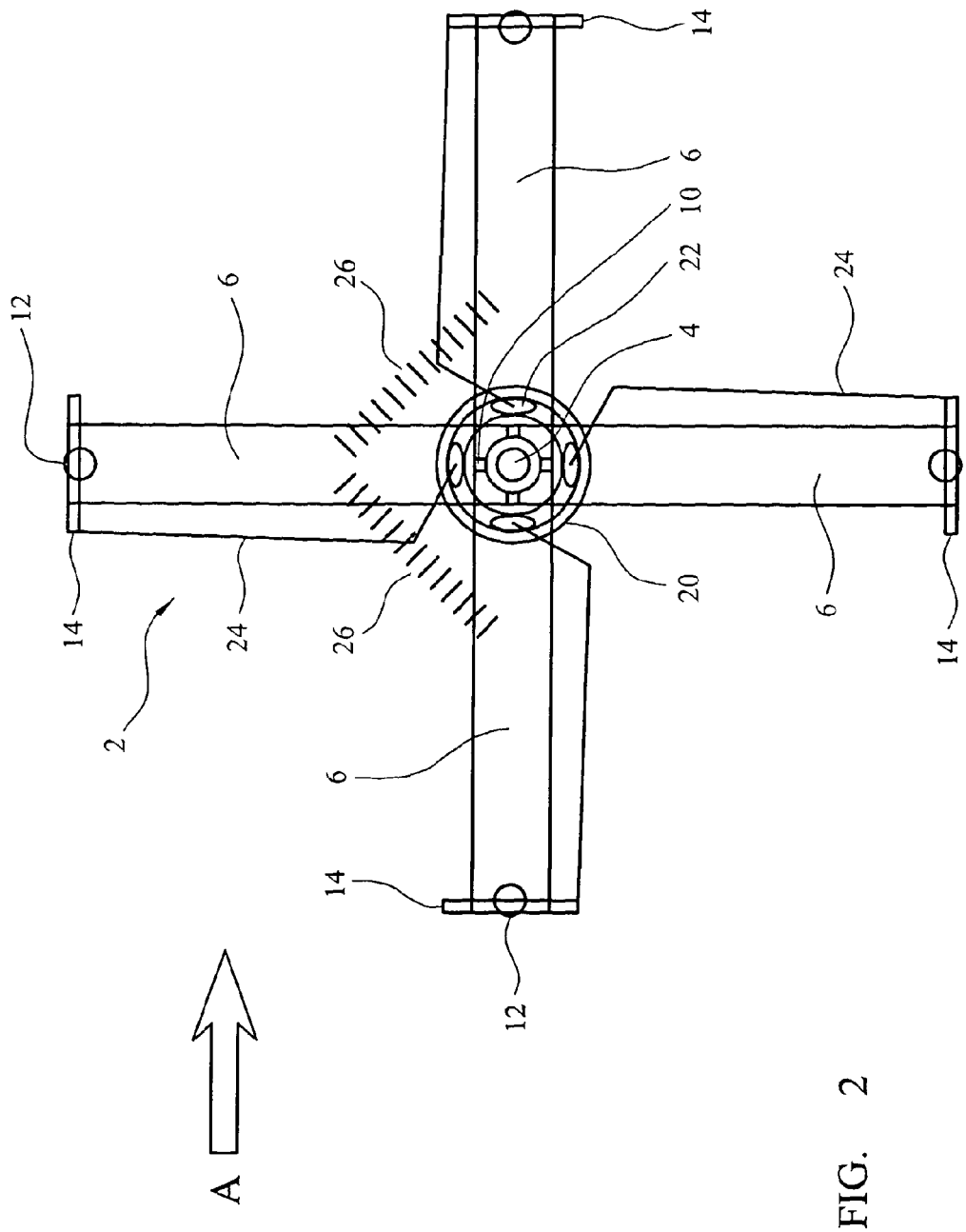
FIG. 2 is a schematic plan view of the apparatus of FIG. 1.

Referring to FIGS. 1 and 2, an electricity generating apparatus 2 embodying the present invention is a lift-based cross flow turbine apparatus. The apparatus 2 is located in a stream A of air or water and comprises a central shaft 4 to which two sets of rigid arms 6 are pivotably attached by means of axially spaced clutches 8 for enabling rotation of the arms 6 in one sense about the longitudinal axis of the central shaft 4, and by means of pivots 10 for rotation about respective horizontal axes. The clutches 8 are arranged such that only the faster rotating pair of arms 6 drives the shaft 4 and the slower rotating pair of arms 6 freewheels. Each pair of arms 6 is attached at its distal ends via universal joints 12 to respective blades 14 such that pivoting of the arms 6 about the respective horizontal axes raises one of the blades 14 and lowers the oppositely arranged blade 14.

A flap 16 is rotatably attached to the shaft 4 by means of a pair of vertically spaced bearings 18 such that the flap 16 orients itself along the direction of fluid flow. This in turn causes alignment of a pair of tilted raceways 20 with the fluid flow. The raceways 20 support the arms 6 on wheels 22 so that rotation of the raceways 20 relative to the shaft causes pivoting of the arms 6 about the respective horizontal pivot axes. As a result, the orientation of the arms 6 relative to the central shaft 4 is dependent upon the orientation of the flap 16 relative to the central shaft 4, which in turn is dependent upon the direction of fluid flow.

The wheels 22 are connected to control arms 24 (FIG. 2) which are in turn connected to the blades 14 via universal joints 12. As a result, rotation of the raceways 20 adjusts the orientation of the blades 14 relative to the arms 6. In this way, the orientation of the blades 14 depends upon the orientation of the flap 16, which in turn depends upon the direction of fluid flow. The two pairs of arms 6 are pivotable relative to each other but are interconnected by spring arrangements 26 to keep them within approximately 35 degrees of being at right angles to each other. Rotation of the central shaft 4 operates an electrical generator 28 by means of a belt and pulley arrangement 30.

The operation of the apparatus 2 shown in FIGS. 1 and 2 will now be described.

Fluid flow causes the flap 16 to align itself with the fluid flow downstream of the central shaft 4, which in turn sets the alignment of the tilted raceways 20. This in turn sets the angle of inclination of the arms 6 and the pitch of the blades 14. The arms 6 then rotate about the longitudinal axis of the central shaft 4 as a result of engagement of the fluid flow with the blades 14, as a result of which the arms 6, and therefore the blades 14, follow an orbit inclined relative to the fluid flow. As a result, the blade 14 upstream of the fluid flow is raised and the blade 14 downstream from the fluid flow is lowered.

As a result, the blades 14 on the upstream side of the central shaft 4 experience lift and produce torque in a manner similar to a conventional vertical axis wind turbine (VAWT). However, in the case of the blades 14 on the downstream side of the central shaft 4, which would in conventional apparatus experience similar levels of drag but reduced fluid flow because kinetic energy has already been extracted by the upstream blades 14, the inclination of the orbit of the blades 14 of FIG. 1 causes the downstream blade 14 to experience more unhindered fluid flow than in a conventional apparatus. The extent of unhindered flow is determined by the geometry of the apparatus (e.g. radius, blade length and angle of canted orbit) but would typically be of the order of 70-80% of the area swept by the blades 14.

The use of spring arrangements 26 between the pairs of arms 6 prevents the angular displacement between the pairs of arms 6 being too far from a right angle (i.e. within approximately 35 degrees). One pair of blades 14 experiencing higher torque will accelerate and increase the angle between a pair of adjacent arms 6 (to approximately 125 degrees just as the first pair of blades 14 are leaving the fast, high torque segment of the orbit) which extends the spring 26 and therefore assists in acceleration of the second pair of blades 14 which are just entering the same segment, causing the other pair of blades 14 to travel at higher speed across the fluid flow.

Referring to FIG. 3(i) a fluid engaging member 60 for assisting starting of the lift-based cross flow turbine apparatus 2 of FIG. 1 is shown and comprises an elongate "aerofoil-type" profile. A respective member 60 is pivotably mounted to each of the arms 6. The member 60 can extend either substantially the full width of the corresponding arm 6, or a series of members 60 can be provided along the length of the arm 6 and which are independently pivotable relative to each other.

When the apparatus 2 is at rest, or rotating slower than the fluid flow, the external surface 62 of the member 60 experiences net flow from the direction of the trailing edge 64 of the member 60, as a result of which the member 60 pivots about arm 6 from position A shown in FIG. 3(ii) to position B, at which it abuts against a stop (not shown). This increases the cross sectional area of the member 60 in a direction transverse to the direction of fluid flow, as a result of which the fluid flow then exerts a force which assists in rotation of the arm 6 about the central support 4.

This can continue at low speed, until lift forces become predominant, and when the member 60 reaches the speed of fluid flow, it reverts to position A in FIG. 3(ii) at which minimal parasitic drag forces occur.

Fluid flow over a fixed blade in a crossflow turbine is not optimum at all points of the blade orbit, and greater lift and efficiency can be obtained by varying the blade pitch—the angle between fluid flow vector and blade chord—with azimuthal angle of blade 14 in relation to fluid flow as the turbine rotates. Sinusoidal pitch variation, where pitch is zero when the blade is moving parallel to the fluid flow and at a maximum when the blade crosses said flow at right angles, is more efficient. Such sinusoidal control can be achieved by linking the sinusoidal tilting motion of the turbine arms 6 directly to pitching movement of the blade 14 about the latter's vertical (longitudinal) axis.

One method is to link the hinge 12 that connects arm 6 and blade 14 with the trailing edge of the blade by means of a simple rotating cam or lever arrangement.

FIG. 4 shows a schematic side view of a cam arrangement 32 of a second embodiment of the invention. When the arm 6 is horizontal, the blade leading edge 14A and trailing edge, running vertically through C2, follow identical orbits. As the blade 14 rises on the upstream side of the turbine, the internal angle between arm 6 and blade 14 decreases, the cam 32 (or a lever) rotates to position C1 and pulls in the trailing edge of the blade by a vertical distance C1 to C2 in relation to its leading edge 14A, thus rotating the blade by a few degrees, which will generally be sufficient for optimum efficiency.

Similarly, as the blade 14 orbits lower on the downstream side of the turbine, the internal angle between arm 6 and blade 14 increases, so the cam 32 rotates to push out the trailing edge to a vertical through C3, to again achieve a suitable blade pitch for improved efficiency.

The cam mechanism 32 (or lever mechanism) can be refined if necessary in order to vary the blade pitch other than sinusoidally. For example, the blade pitch can be adjusted by use of limiting stops, or extra links, points of rotation or relative movement. The mechanism 32 can also readily be refined to vary pitch as a function of blade rotation speed, by using the blade's centrifugal force to vary the distance moved by sprung cams or levers.

It will be appreciated by persons skilled in the art that the above embodiment has been described by way of example only, and not in any limitative sense, and that various alterations and modifications are possible without departure from the scope of the invention as defined by the appended claims.

The invention claimed is:

1. A drive apparatus for driving an electrical generator, the drive apparatus comprising: a shaft; a pair of first arms spaced apart along the shaft and rotatably and pivotably coupled to the shaft, wherein each first arm extends radially outwards from the shaft; a pair of second arms spaced apart along the shaft and rotatably and pivotably coupled to the shaft, wherein each second arm extends radially outwards from the shaft; a first blade extending between the first arms and spaced from the shaft, the first blade being supported by the first arms; a second blade extending between the second arms and spaced from the shaft, the second blade being supported by the second arms; and a flap pivotably mounted to the shaft and operatively engaged with the first arms and the second arms such that pivotal movement of the flap relative to the shaft pivots the first arms and the second arms relative to the shaft; wherein the drive apparatus is configured such that, when in use, each first blade and each second blade experiences fluid dynamic lift, and a direction of fluid flow causes the flap to align with the flowing fluid to cause pivotal movement of the first arms and the second arms relative to the shaft such that each first blade and each second blade follows an orbit which is inclined relative to the shaft, said orbit being inclined such that each said first blade and each said second blade cross the fluid flow at an upstream side of the drive apparatus at a first height, and cross the fluid flow at a downstream side of the drive apparatus at a second height, the second height being different from the first height.

2. The apparatus of claim 1, wherein the flap is connected to the shaft via a plurality of wheels engaging a track.

3. The apparatus of claim 1, wherein, when in use, rotation of the first arms about the shaft adjusts the orientation of the first blade relative to the first arms, and rotation of the second arms about the shaft adjusts the orientation of the second blade relative to the second arms.

4. The apparatus of claim 3, further comprising a cam arrangement connecting the first blade to the first arms and connecting the second blade to the second arms.

5. The apparatus of claim 1, further comprising a first fluid engaging member mounted to one of the first arms for increasing the cross sectional area of engagement between the fluid and the first arm in a direction transverse to a direction of flow of the fluid relative to the first arm when the first fluid engaging member moves more slowly than the fluid.

6. The apparatus of claim 5, wherein the first fluid engaging member has an elongate cross section in a direction transverse to a longitudinal axis of the first arm.

7. The apparatus of claim 1, further comprising a second fluid engaging member mounted to one of the second arms for increasing the cross sectional area of engagement between the fluid and the second arm in a direction transverse to a direction of flow of the fluid relative to the second arm when the second fluid engaging member moves more slowly than the fluid.

8. The apparatus of claim 7, wherein the second fluid engaging member has an elongate cross section in a direction transverse to a longitudinal axis of the second arm.

9. The apparatus of claim 1, further comprising a clutch connecting the first arms to the shaft and connecting the second arms to the shaft.

10. The apparatus of claim 1, further comprising a spring arrangement interconnecting one of the first arms and one of the second arms.

11. An electrical generator comprising the drive apparatus of claim 1, and an apparatus for generating electricity adapted to be actuated by the drive apparatus.

12. A drive apparatus for driving an electrical generator, the drive apparatus comprising: a shaft; a pair of first arms spaced apart along the shaft and rotatably and pivotably coupled to the shaft, wherein each first arm extends radially outwards from the shaft; a pair of second arms, having an interconnection with the pair of first arms comprising a spring arrangement, one of the first arms and one of the second arms spaced apart along the shaft and rotatably and pivotably coupled to the shaft, wherein each second arm extends radially outwards from the shaft; a first blade extending between the first arms and spaced from the shaft, the first blade being supported by the first arms; a second blade extending between the second arms and spaced from the shaft, the second blade being supported by the second arms; and a flap pivotably mounted to the shaft and operatively engaged with the first arms and the second arms such that pivotal movement of the flap relative to the shaft pivots the first arms and the second arms relative to the shaft; wherein a clutch connects the first arms to the shaft and a clutch connects the second arms to the shaft; and wherein the drive apparatus is configured such that, when in use, each first blade and each second blade experiences fluid dynamic lift, and a direction of fluid flow causes the flap to align with the flowing fluid to cause pivotal movement of the first arms and the second arms relative to the shaft such that each first blade and each second blade follows an orbit which is inclined relative to the shaft such that each said first blade and each said second blade cross the fluid flow at an upstream side of the drive apparatus at a first height, and cross the fluid flow at a downstream side of the drive apparatus at a second height, the second height being different from the first height.

* * * * *